United States Patent [19]
Radloff et al.

[11] Patent Number: 5,997,115
[45] Date of Patent: Dec. 7, 1999

[54] COMPUTER ACCESS PANEL HAVING SINGLE POINT RELEASE INTERLOCK MECHANISM

[75] Inventors: Timothy Radloff, Austin; Stephen Cook, Georgetown, both of Tex.

[73] Assignee: Dell U.S.A., L.P., Round Rock, Tex.

[21] Appl. No.: 08/947,006

[22] Filed: Oct. 8, 1997

[51] Int. Cl.⁶ .................................................. E05B 65/46
[52] U.S. Cl. ............................ 312/222; 292/19; 292/91; 292/DIG. 38; 312/223.2
[58] Field of Search ............................. 292/DIG. 38, 19, 292/91, 87; 312/223.3, 222, 265.6

[56] References Cited

U.S. PATENT DOCUMENTS

| | | | |
|---|---|---|---|
| 4,730,731 | 3/1988 | Allison | 292/DIG. 38 |
| 4,909,579 | 3/1990 | Liu . | |
| 4,938,513 | 7/1990 | Gunderson . | |
| 5,253,142 | 10/1993 | Weng | 292/91 |
| 5,397,176 | 3/1995 | Allen et al. . | |
| 5,575,546 | 11/1996 | Radloff . | |
| 5,577,779 | 11/1996 | Dangel . | |
| 5,580,107 | 12/1996 | Howell . | |
| 5,601,349 | 2/1997 | Holt . | |
| 5,650,911 | 7/1997 | Scholder et al. . | |
| 5,825,626 | 10/1998 | Hulick et al. | 292/19 |

OTHER PUBLICATIONS

Patent Application No. 08/698,817; Entitled: Computer Cabinet Latching Mechanism; Inventor: Erica Scholder.

*Primary Examiner*—Peter M. Cuomo
*Assistant Examiner*—Gerald O. Anderson
*Attorney, Agent, or Firm*—Haynes and Boone, L.L.P.

[57] ABSTRACT

A computer system includes a chassis and an access panel mounted on the chassis. The panel includes multiple spaced apart interlocks for mounting the panel on the chassis. A latch is operably connected to the chassis to engage and release the interlocks. The latch includes a main body, a latch member extending from each opposite end of the body for engagement with the interlocks, a single point pressure member and a pair of cantilevered support members extending from the single point pressure member. The support members include extensions for engaging the chassis and retaining the single point pressure member and each latch member in a raised position relative to the chassis for engagement with the interlocks. The application of pressure to the single point pressure member, moves the device to release the latches out of engagement with the interlocks.

16 Claims, 4 Drawing Sheets

COMPUTER ACCESS PANEL HAVING SINGLE POINT RELEASE INTERLOCK MECHANISM

BACKGROUND

The disclosures herein relate generally to computer chassis and more particularly to an access panel attached to the chassis and including a single point release mechanism for unlatching the panel from the chassis.

A typical computer enclosure is usually made up of a chassis, one or more covers, and a bezel, which is the front cosmetic cover of the computer system. There are many combinations of these elements in current computer hardware components. In any enclosure, the ease with which the covers and the bezel can be assembled and removed are important for manufacturability, serviceability and customer satisfaction.

Many computers have covers and bezels which are fastened in place with hardware such as screws. An immediate gain in manufacturability, serviceability and customer satisfaction can be gained by using integral snaps which are easily engaged and released. The main benefit is that a tool is not needed to gain access to the internal components or bays of the computer. There are many computer housings which utilize snaps and hooks in the bezel and covers to provide these added benefits. However, not every enclosure can be easily outfitted with such devices. Due to a variety of issues with how the covers and bezel must be assembled or removed from the system and how the components must be integrated with the chassis, the possibility of adding snap-on/snap-off functionality is limited.

In accordance with one attempted solution to the above-mentioned problem, a tower unit housing for a computer system has been provided including a rectangular box-like chassis which receives a front bezel, an L-shaped hood to cover the top and one side of the chassis and a side member to cover the other side of the chassis. The chassis includes a security tab which is aligned with a hood security tab and a side cover security tab when the hood and side cover are installed on the chassis, such that openings in the tabs can receive a single lock to lock the entire unit together. The front bezel includes its own security tab which extends into a pin connection inside of the chassis such that the pin connection between the bezel and the chassis is hidden by the side cover when the side cover and L-shaped hood are installed on the chassis. In this manner, a single lock can secure the front bezel and the L-shaped hood and the side cover from unauthorized disassembly.

Another enclosure is characterized by a sheet-metal chassis, two cosmetic cover panels and a separate front panel. Each cover panel covers half of the chassis top and one of the sides. The bezel covers the front of the chassis and has openings for the accessible drive bays as well as buttons for interfacing with the computer control panel. To save shipping costs and reduce the time and cost of assembly in the manufacturing process, the right side cover of the chassis is designed to be shipped as part of an assembly with the chassis. The fixed nature of the right side cover combined with some of the internal bracketry of the chassis create accessibility problems to many points in the chassis.

The limited accessibility discussed above precludes using a traditional approach for snapping the bezel in place during assembly and removing the bezel for service or upgrades by a customer. The problem is magnified by the specifics of the bezel tooling which greatly reduces the design flexibility. The problem is that of providing a method for reliably securing the bezel by having multiple closure points, yet being able to release the bezel from an easily accessible location without the use of special tools or the need for specialized knowledge of the closure detail.

Therefore, what is needed is a computer chassis including an access panel having multiple interlocks attaching the panel to the chassis and a single release operably connected to release the interlocks from the chassis.

SUMMARY

One embodiment, accordingly, provides a panel release device which engages a panel at multiple interlock positions and can release the panel by activating the device with pressure applied at a single point. To this end, a computer system includes a latch adapted to be mounted on a computer chassis for retaining and releasing a chassis cover panel. The latch includes a main body, a plurality of latch members extending from the body, a single point pressure member on the body, and support members on the body maintaining the single point pressure member and the latch members in a raised position relative to the chassis.

A principal advantage of this embodiment is that the latch stabilizes the interlocking of a chassis panel, such as a bezel, to the chassis due to the manner in which the latch engages the bezel. For release of the bezel, pressure applied to the single point pressure member, simultaneously disengages multiple latch points.

DETAILED DESCRIPTION OF THE PREFERRED EMBODIMENT

Figure 1:
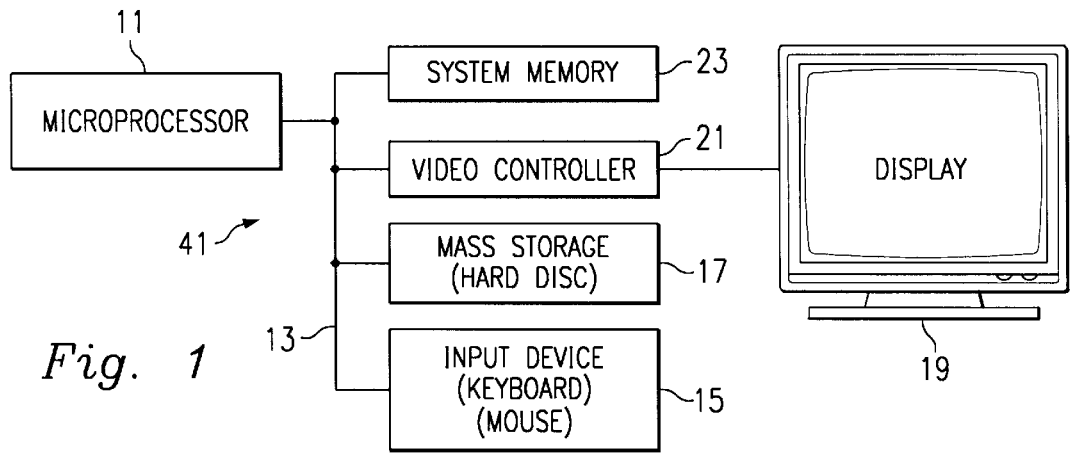
FIG. 1 is a view illustrating an embodiment of a computer system.

In one embodiment computer system 41, FIG. 1, includes a microprocessor 11 which is connected to a bus 13. Bus 13 serves as a connection between microprocessor 11 and other components of computer system 41. An input device 15 is coupled to microprocessor 11 to provide input to microprocessor 11. Examples of input devices include keyboards, touchscreens, and pointing devices such as mouses, trackballs and trackpads. Programs and data are stored on a mass storage device 17 which is coupled to microprocessor 11. Mass storage devices include such devices as hard disks, optical disks, magneto-optical drives, floppy drives and the like. Computer system 41 further includes a display 19 which is coupled to microprocessor 11 by a video controller 21. A system memory 23 is coupled to microprocessor 11 to provide the microprocessor with fast storage to facilitate execution of computer programs by microprocessor 11. It should be understood that other busses and intermediate circuits can be deployed between the components described above and microprocessor 11 to facilitate interconnection between the components and the microprocessor.

Figure 2:
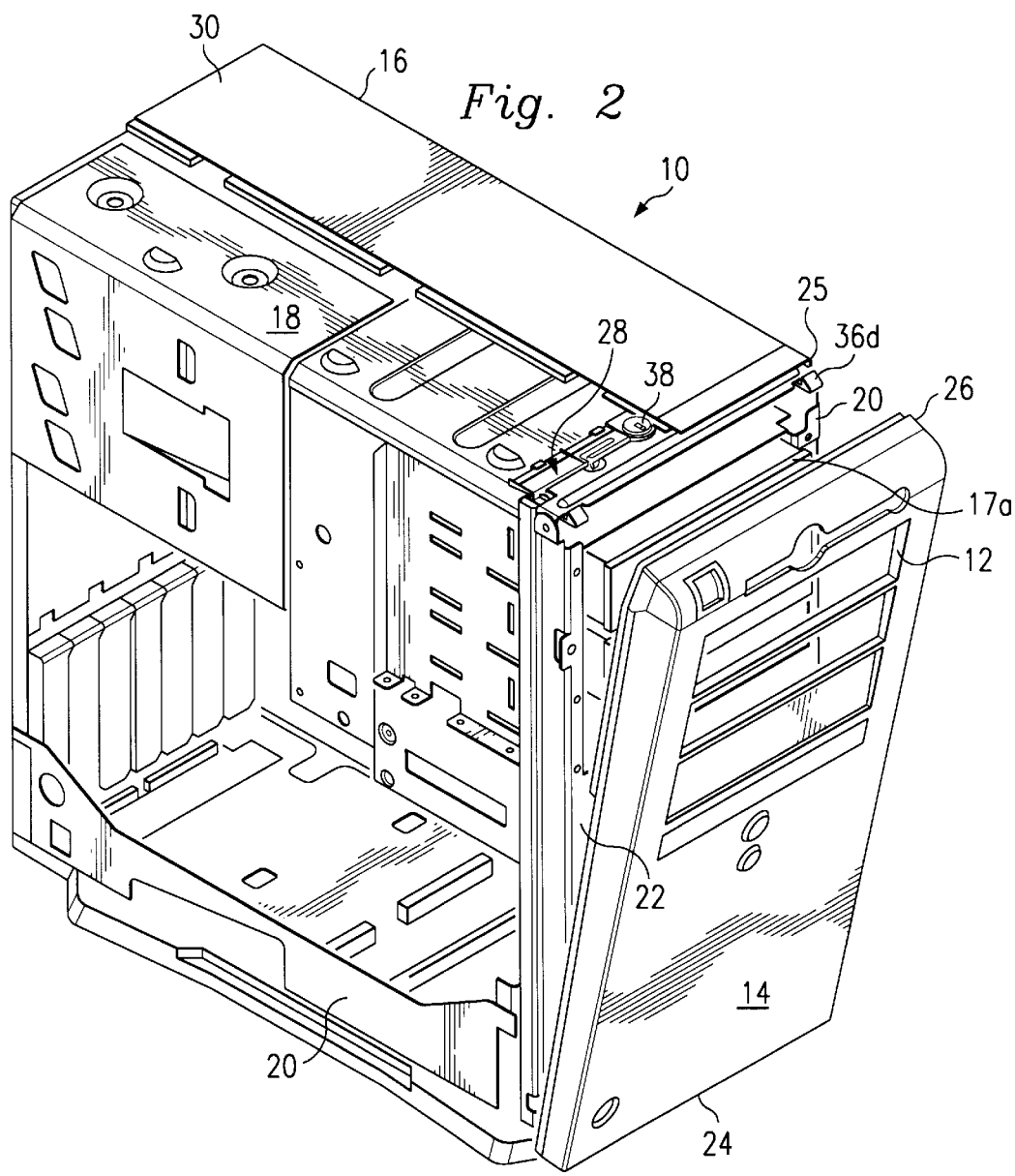
FIG. 2 is an isometric view illustrating an embodiment of a chassis used in a computer system.

Referring to FIG. 2, a chassis is generally designated 10 and is used to store many components of computer system 41 including, but not limited to, mass storage device 17 such as a disk drive, which is accessible through a drive bay opening 12 in a bezel or front cover panel 14. Chassis 10 also includes a first cover panel 16, which is substantially identical to a second cover panel, which has been removed and is therefore not shown. The first cover panel 16 includes an L-shaped panel having a top portion 30, which covers one-half of a top surface 18 of the chassis 10, and a side portion 25 which covers one of a pair of opposed side surfaces 20 of chassis 10. Similarly, the second cover panel which is not shown, includes a top portion and a side portion. Bezel 14 is pivotally attached to a chassis front surface 22 at a first end 24 and is provided, at a second end 26 to receive a latch (discussed later) for securing bezel 14 to the front surface 22.

Figure 3:
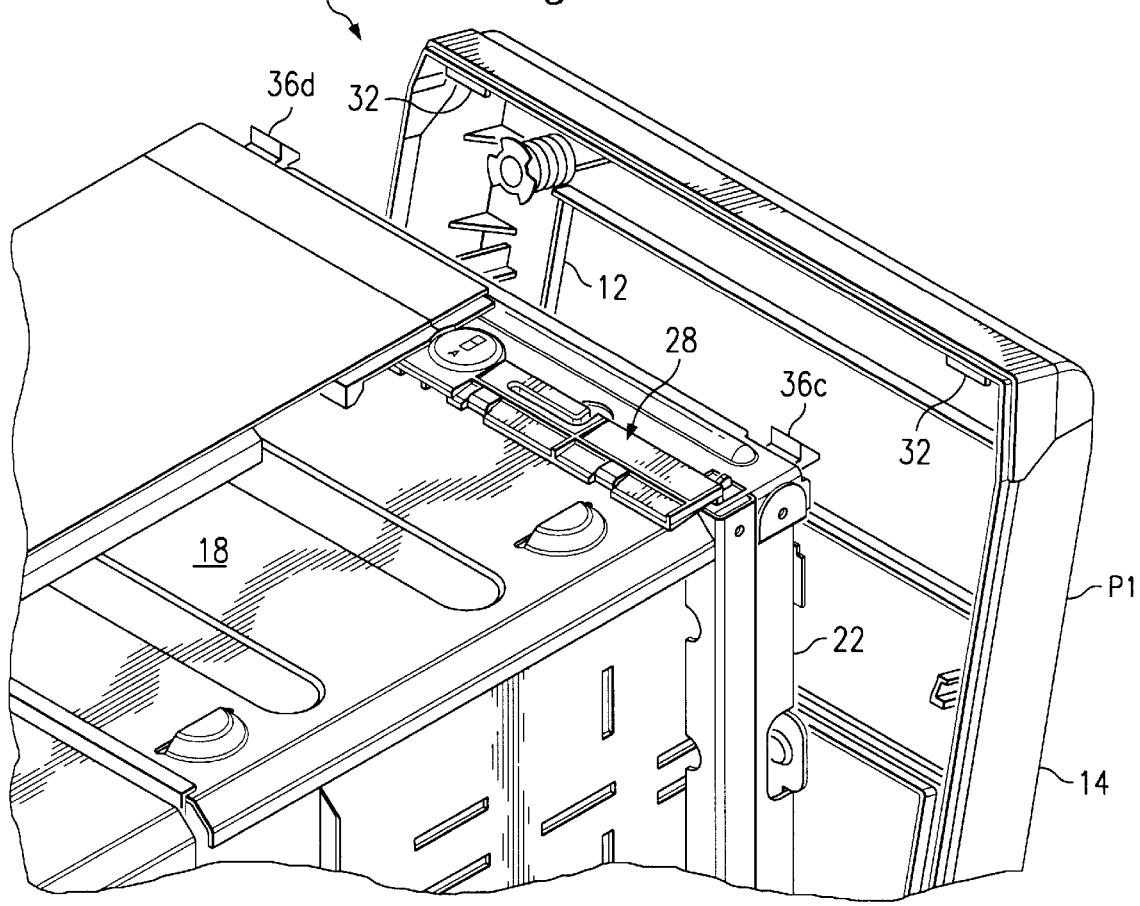
FIG. 3 is a partial isometric view illustrating an embodiment of a chassis having a bezel disengaged from a latching device.
Figure 4:
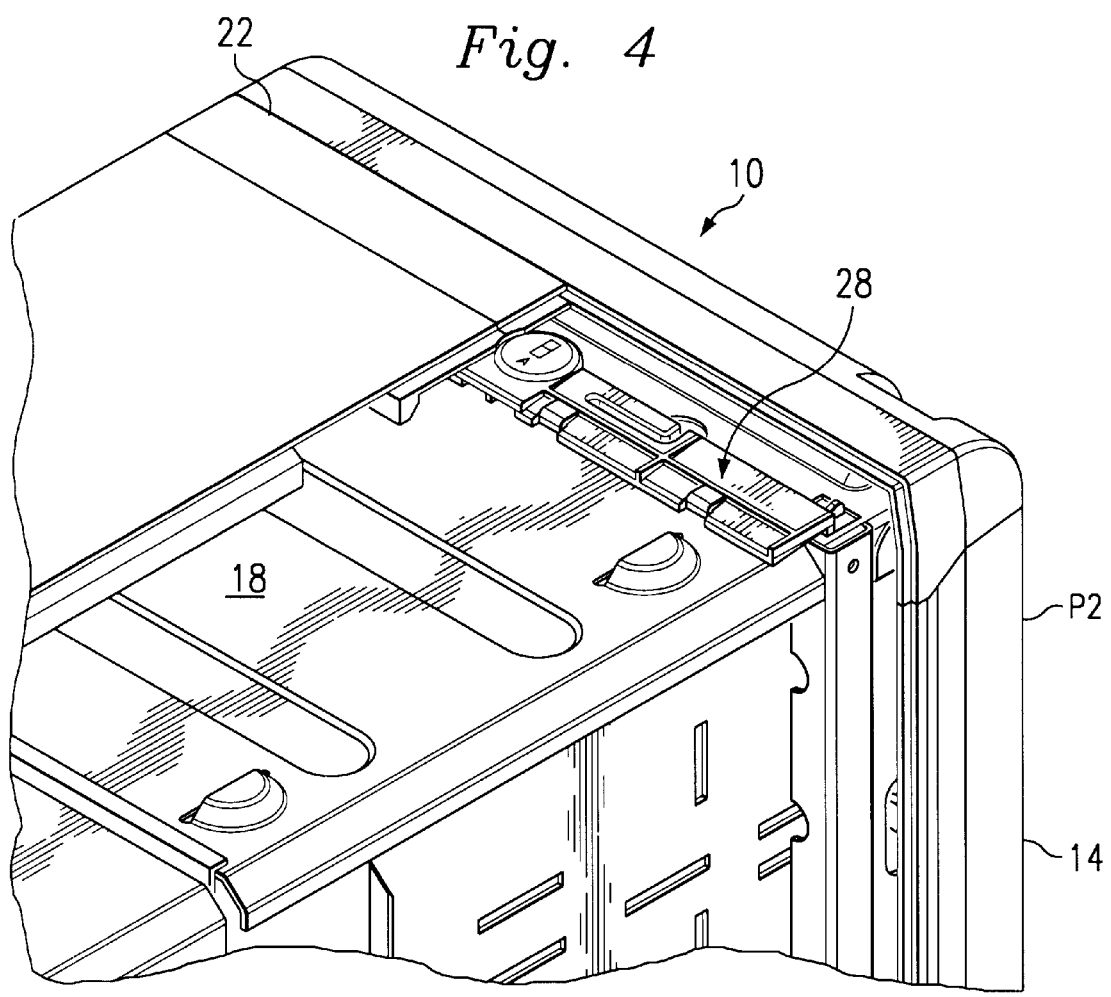
FIG. 4 is a partial isometric view illustrating an embodiment of a chassis having a bezel engaged with the latching device.

Referring to FIGS. 3 and 4, it can be seen that a partially shown latch 28 is mounted on top surface 18 of chassis 10. Latch 28 extends toward bezel 14 so that the bezel 14, shown in an open position P1, FIG. 3, can receive latch 28 at a pair of extended lip portions 32 of bezel 14 for maintaining bezel 14 in a closed position P2, FIG. 4. In the open position P1, FIG. 3, front chassis surface 22 is exposed and accessible, whereas in closed position P2, front chassis surface 22 is covered, FIG. 4, and access through drive bay opening 12 is required, see FIG. 3.

Figure 5:
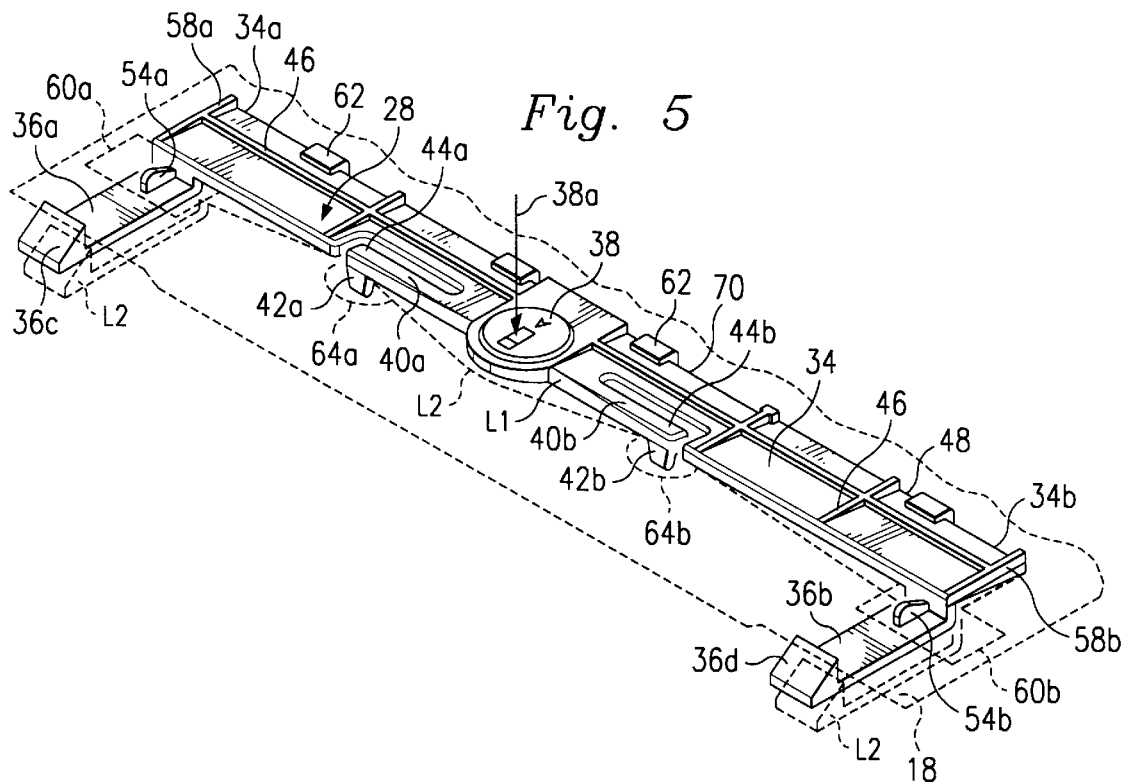
FIG. 5 is an isometric view illustrating an embodiment of the latching device mounted on a chassis surface.

Referring to FIG. 5, latch 28 is illustrated and includes a main body 34, substantially planar and formed of a suitable, flexible synthetic material such as PC-ABS. Latch 28 includes a pair of latch members 36a and 36b, each extending from an opposite end 34a, 34b, respectively of main body 34. Actually, latch members 36a, 36b are angularly disposed relative to the plane of main body 34. Latch members 36a, 36b are spaced apart by the approximate end-to-end dimension of main body 34 and each includes a hook 36c, 36d, respectively. A single point pressure member 38 is provided on main body 34. Support members in the form of a pair of cantilever arms 40a, 40b, extend outwardly from pressure member 38 in opposite directions toward opposite ends 34a, 34b, respectively. A pair of leg extensions 42a, 42b each extend from a free end 44a, 44b of arms 40a, 40b, respectively. Leg extensions 42a, 42b, extend perpendicular to a longitudinal axis of each respective cantilever arm 40a, 40b. Main body 34 includes a plurality of reinforcing ribs 46, which add strength to main body 34 but permit member 34 to remain flexible. Means such as a plurality of detents 48, are provided in an edge 70 of main body 34. Also provided is a wedge 54a on latch member 36a and a wedge 54b on latch member 36b. Main body 34 also includes an end portion 58a on end 34a and an end portion 58b on end 34b.

Figure 6:
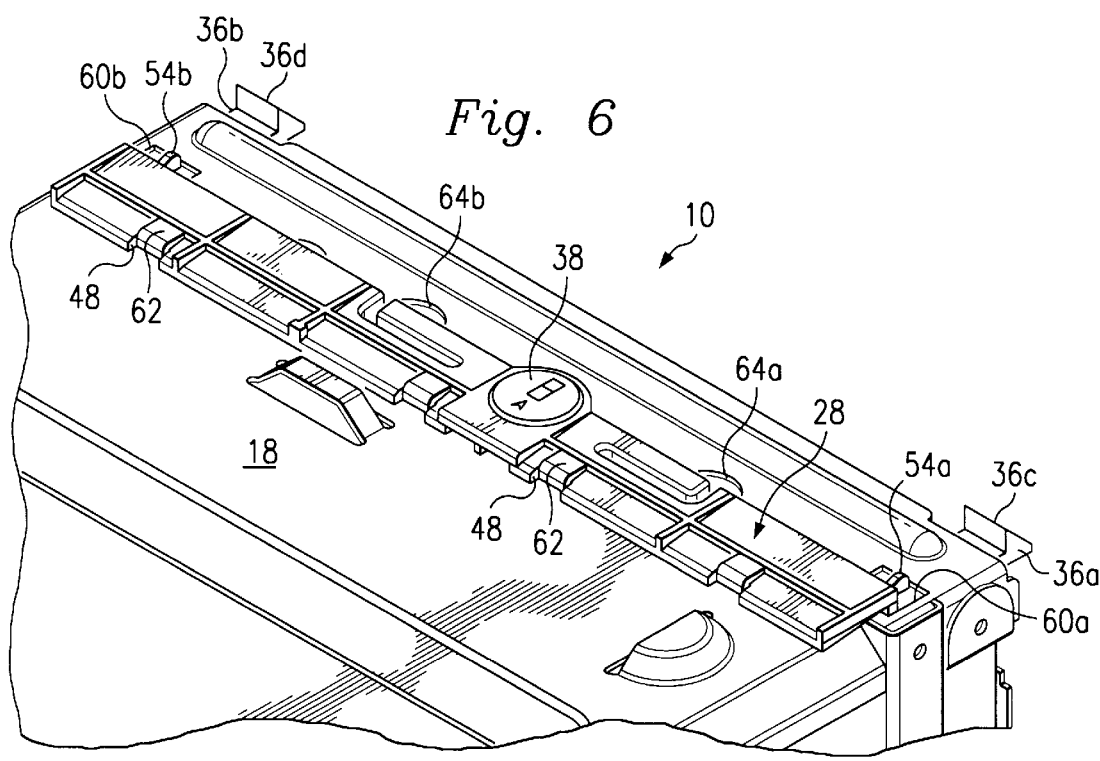
FIG. 6 is a partial isometric view illustrating an embodiment of the latching device mounted on the chassis.

In FIGS. 5 and 6, latch 28 is mounted on top chassis surface 18. Latch members 36a and 36b extend through a pair of apertures 60a, 60b, respectively formed in chassis surface 18. Wedges 54a, 54b protrude through apertures 60a, 60b, respectively, and limit movement of main body 34 relative to chassis surface 18. A plurality of clamps 62, FIG. 6, extend from chassis surface 18 and engage detents 48 for further limiting movement of and retaining main body 34 and on chassis surface 18. Leg extensions 42a, 42b, FIG. 5, engage pads 64a, 64b, respectively, on chassis surface 18, thus biasing the main body 34, including the single point pressure member 38 and latch members 36a, 36b in a raised position L1 relative to chassis surface 18. When pressure is applied to single point pressure member 38, as indicated by a directional arrow 38a, cantilever arms 40a, 40b deflect to permit single point pressure member 38 to move toward top chassis surface 18 to a position L2 indicated in phantom in FIG. 5. Concurrently, main body member 34 pivots about edge 70 which permits latch members 36a, 36b to deflect to position L2 which is sufficient to release hooks 36c, 36d from lip portions 32 of bezel 14 (see FIG. 3).

In operation, reinforcing ribs 46, FIG. 5, provide strength to optimize rotary motion of latch members 36a, 36b when single point pressure member 38 is pressed. Hooks 36c, 36d interface with lip portions 32, FIG. 3, of bezel 14 to retain and stabilize bezel 14 in place on chassis 10. Clamps 62 and wedges 54a, 54b, FIG. 5, limit movement of latch 28 toward and away, respectively, from bezel 14. Detents 48 mate with clamps 62 along edge 70 of main body 34 to create a pivot or hinge axis for rotation of latch 28.

Bezel 14 is installed by pivotally attaching first end 24, FIG. 2, to a portion of surface 22 of chassis 10 and rotating bezel 14 toward front surface 22. When bezel 14 mates with front chassis surface 22, hooks 36c, 36d are urged downwardly and then snap into engagement with lip portions 32. The fact that hooks 36c, 36d are spaced apart provides stability to the interlock between latch 28 and bezel 14, and helps to control the cosmetics by maintaining a consistent interface between bezel 14 and chassis 10.

Bezel 14, FIG. 2, is removed by pressing single point pressure member 38 which acts against the bias of cantilever arms 40a, 40b, FIG. 5, and rotates main body 34, including the spaced apart latch members 36a, 36b, out of engagement with lip portions 32 of bezel 14, FIG. 2, and allows bezel 14 to be rotated away from front chassis surface 22. Also, the first cover panel 16 need not be removed from chassis 10 to provide access to single point pressure member 38. In addition, only one hand is required to release latch 28, thus giving freedom to the other hand to remove bezel 14.

As it can be seen, the principal advantages of these embodiments are that a mechanism is provided to include multiple interlock points which are actuated by a single release point. The latch is a low cost part that is easy to manufacture, install and implement as part of a chassis assembly, as well as providing quick removal and access for service. The latch stabilizes the interlocking of the bezel to the chassis due to the manner in which the multiple latch points engage the bezel. For release of the bezel, pressure applied to the single point pressure member simultaneously disengages the multiple latch points.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A latch system comprising:

a latch adapted to be mounted on a computer chassis for retaining and releasing a chassis cover panel, the latch including a main body having opposite ends;

an elongated edge of the main body provided for pivotally engaging the chassis;

a plurality of first members on the latch for limiting movement of the main body on the chassis;

a plurality of second members on the latch for limiting movement of the body on the chassis;

a plurality of latch members extending from the body;

a single point pressure member on the body; and support members on the body for engaging the chassis and maintaining the single point pressure member and the latch members in a raised position relative to the chassis, the support members extending outwardly from the single point pressure member and terminating at a respective leg member for engagement with the chassis.

2. The latch system as defined in claim 1 wherein each latch member is angularly disposed relative to the main body.

3. The latch system as defined in claim 1 wherein each latch member includes a hook.

4. The computer system as defined in claim 1 wherein the main body includes reinforcing ribs.

5. The latch system as defined in claim 1 wherein the single point pressure member is positioned between opposite ends of the main body.

6. The latch system as defined in claim 5 wherein the support members include a pair of cantilever arms.

7. The latch system as defined in claim 6 wherein the first members are detents in the elongated edge.

8. The latch system as defined in claim 1 wherein the second members are wedges extending from the latch members.

9. A computer chassis latch comprising:

a computer chassis; and a latch mounted on the chassis for retaining and releasing a chassis cover panel, the latch including a main body having opposite ends;

an elongated edge of the main body provided for pivotally engaging the chassis;

a plurality of first members on the latch for limiting movement of the main body on the chassis;

a plurality of second members on the latch for limiting movement of the main body on the chassis;

a latch member extending from each opposite end of the body and through a respective aperture formed in the chassis;

a single point pressure member on the body; and support members on the body engaging the chassis and maintaining the single point pressure member and each latch member in a raised position relative to the chassis, the support members extending outwardly from the single point pressure member and terminating at a respective leg member engaged with the chassis.

10. The computer chassis latch as defined in claim 9 wherein each latch member is angularly disposed relative to the main body.

11. The computer chassis latch as defined in claim 9 wherein each latch member includes a hook.

12. The computer chassis latch as defined in claim 9 wherein the body is flexible and includes reinforcing ribs.

13. The computer chassis latch as defined in claim 9 wherein the single point pressure member is positioned between the opposite ends of the main body.

14. The latch as defined in claim 12 wherein the support members include a pair of flexible cantilever arms.

15. The latch as defined in claim 14 wherein the first members are detents in the elongated edge engaged with clamps on the chassis.

16. The latch as defined in claim 1 wherein the second members are wedges extending from the latch members and through the respective apertures.

* * * * *

UNITED STATES PATENT AND TRADEMARK OFFICE
CERTIFICATE OF CORRECTION

PATENT NO.    : 5,997,115
DATED         : December 7, 1999
INVENTOR(S)   : Timothy Radloff and Stephen Cook It is certified that error appears in the above-identified patent and that said Letters Patent is hereby corrected as shown below:

Column 5,
Line 14, please delete the word "computer" and insert therefor -- latch --.

Signed and Sealed this

Fifth Day of November, 2002

Attest:

JAMES E. ROGAN
Attesting Officer    Director of the United States Patent and Trademark Office